United States Patent [19]
Matias

[11] Patent Number: 5,528,374
[45] Date of Patent: Jun. 18, 1996

[54] NETWORKED REPRODUCTION APPARATUS WITH SECURITY FEATURE

[75] Inventor: Luis A. Matias, Rochester, N.Y.

[73] Assignee: Eastman Kodak Company, Rochester, N.Y.

[21] Appl. No.: 155,493

[22] Filed: Nov. 22, 1993

[51] Int. Cl.⁶ ........................................... H04N 1/21
[52] U.S. Cl. ........................... 358/296; 358/437; 358/444
[58] Field of Search ........................... 358/296, 434–439, 358/444, 468; 395/114

[56] References Cited

U.S. PATENT DOCUMENTS

| | | | |
|---|---|---|---|
| 4,597,018 | 6/1986 | Sonohe et al. . | |
| 4,894,805 | 1/1990 | Godshalk et al. . | |
| 4,947,345 | 8/1990 | Paradise et al. | 364/519 |
| 4,975,783 | 12/1990 | Takaoka | 358/404 |
| 5,034,770 | 7/1991 | O'Connell . | |
| 5,075,782 | 12/1991 | Tufano et al. | 358/437 |
| 5,128,772 | 7/1992 | Farrell et al. . | |
| 5,164,842 | 11/1992 | Gauronski et al. | 358/401 |
| 5,179,637 | 1/1993 | Nardozzi | 395/114 |
| 5,187,587 | 2/1993 | Farrell et al. . | |
| 5,323,393 | 6/1994 | Barrett et al. | 370/85.8 |
| 5,335,085 | 8/1994 | Nakatsuma | 358/404 |
| 5,365,349 | 11/1994 | Knodt et al. | 358/406 |

Primary Examiner—Peter S. Wong
Assistant Examiner—K. Shin
Attorney, Agent, or Firm—Norman Rushefsky

[57] ABSTRACT

An electronic/copier printer apparatus includes a scanner for scanning original documents representing a copy from a first source of image information and printer input means for receiving electrical signals representing electronic information of a production job from a second source of information. A marking engine prints production jobs. The marking engine means includes means for communicating with the scanner and the printer input means. A memory forms a part of the marking engine and stores electrical signals representing production jobs from the first and second sources. The marking engine includes a security mode wherein in response to a loss of communication with one of the scanner and the printer input means while communication remains with the other there is selectively prevented production of production jobs stored in said memory means and derived from the one to which communication is lost while selectively printing production jobs from the other to which communication remains. A network is also described wherein one or more input devices is coupled to one or more marking engines and a similar security mode is provided. That is, loss of communication between a marking engine and a front end device precludes printing of information already stored in the marking engine and derived from the source to which communication is lost.

15 Claims, 3 Drawing Sheets

NETWORKED REPRODUCTION APPARATUS WITH SECURITY FEATURE

BACKGROUND OF THE INVENTION

1. Technical Field

This invention relates generally to document reproduction apparatus and more particularly, to networks of such apparatus wherein one or more front end image data generating devices are networked with one or more output devices or marking engines.

2. Background Art

In the prior art, reproduction apparatus such as electrophotographic copiers, are known that have a scanner for scanning a document to be reproduced and a marking engine for printing copiers of such document. Where such copiers are to be used in a secure environment, it is desirable to ensure that copies of secure originals not be available to unauthorized individuals. Where the copier is an optical copier, images are flash-exposed onto a photoconductor, developed and transferred to copy sheets. Security for optical copiers involves accessibility to the output copies and cleaning of the photoconductor. Both of these can be controlled without difficulty. Currently, some copiers are being manufactured as electronic copiers. Electronic copiers feature an advantage of providing collated copy sets without multiple scanning of each sheet of a multisheet document set original. With electronic copiers, a multisheet document has its individual sheets electronically scanned seriatim and the image data thereon stored in memory. Plural collated copy sets are realized by reading the data plural times front memory to an electronic writer such as a laser or LED recorder. In considering security of the information that is being copied, it is not enough to consider only control of the output copies and the image on the photoconductor. The information in the memory still retains the secure data. Typically, during a series of production jobs and after jobs are printed, the memory could either be erased before inputting new jobs or new jobs can be written into memory over the secure job; see in this regard U.S. Pat. No. 4,894,805. However, a problem does occur where there is an interruption in say a secure copying job. This interruption could occur for a number of reasons including a paper jam or other type of error condition, pressing the <STOP-RESET> button while the machine is running, making a proof copy, pausing for a key sheet or after a job interrupt mode. If the person authorized to make the copies leaves the machine unattended but removes the originals and copies so far made, the machine is still capable of being placed back into its copying mode for producing copies from memory. In order to block unauthorized access to copies, it is known to provide a security feature to a machine that in the event of a stoppage during a production job, a stoppage for only a predetermined period is tolerated. In response to a signal indicating expiration of the period, a cancel job request is sent to the marking engine and all the data in memory is erased by removing power thereto. The operator control panel is then reset as it would be in a typical power up condition and power is restored to the memory.

A problem with removing power to the memory is that other jobs may also be queued in memory and they are lost as well. This is particularly a problem where multiple front end devices such as scanners, raster image processors, fax or others are connected with one or more marking engines using a suitable network facility.

SUMMARY OF THE INVENTION

It is therefore an object of the invention to overcome the problems of the prior art. These and other objects are realized by an electronic/copier printer apparatus including scanner means for scanning original documents representing a copy production job and generating electrical signals representing said copy production job, said scanner means being a first source of image information; printer input means for receiving electrical signals representing electronic information of a production job from a second source other than said scanner means and for processing said electronic information for input to a marking engine means; marking engine means for printing production jobs, said marking engine means including means for communicating with said scanner means and said printer input means; memory means, forming a part of said marking engine means, for storing electrical signals representing production jobs from said first and second sources; and the improvement which comprises wherein said marking engine includes security means, responsive to a loss of communication with one of said scanner means and said printer input means while communication remains with the other of said scanner means and printer input means for selectively preventing production of production jobs stored in said memory means and derived from the one to which communication is lost while selectively printing production jobs from the other to which communication remains.

In accordance with another aspect of the invention them is provided a network of plural printers and a single front end device comprising a front end device for generating image information to be printed; plural marking engine means, each including means for storing and then printing information from the front end device; connection means coupling the front end device with the marking engines; security means, responsive to a loss in communication between the front end device and one of the marking engines for preventing printing of image information stored in said one marking engine and derived from said one front end device while enabling the marking engines to print image information from said front end devices that remain in communication with said front end device.

In accordance with still another aspect of the invention, there is provided a network of plural printers and plural front end devices comprising plural front end devices forming plural sources of image information to be printed; plural marking engines, each including means for storing and then for printing information from any of the front end devices; connection means coupling the front end devices with the marking engines so that the marking engines communicate with the front end devices and security means, responsive to a loss in communication between one front end device and one marking engine for selectively preventing printing of image information stored in said one marking engine and derived from said one front end device and enabling said one marking engine to print image information from said front end devices to which communications are not lost with said one marking engine.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming pan of, or cooperating more directly with, apparatus in accordance with the present invention. It is to be understood that elements not specifically shown or described may take various forms well known to those skilled in the art.

In this specification, the term "copier" is meant to refer to apparatus arranged for reading the image information on an original hard copy and for reproducing such image information on a receiver sheet. The term "printer" is meant to refer to apparatus arranged for receiving image information in other than hard copy form and for reproducing such image information on a receiver sheet. The term "original" is meant to refer to image information to be reproduced, whether such image information is in hard copy, electronic, or other form. The term "reproduction apparatus" is meant to refer to copiers and/or printers. A "production job" refers to a reproduction task for producing hard copy output of an original in accordance with a set of production requirements. Typically, a production job may involve one or more pages of related hard copy output.

Figure 1:
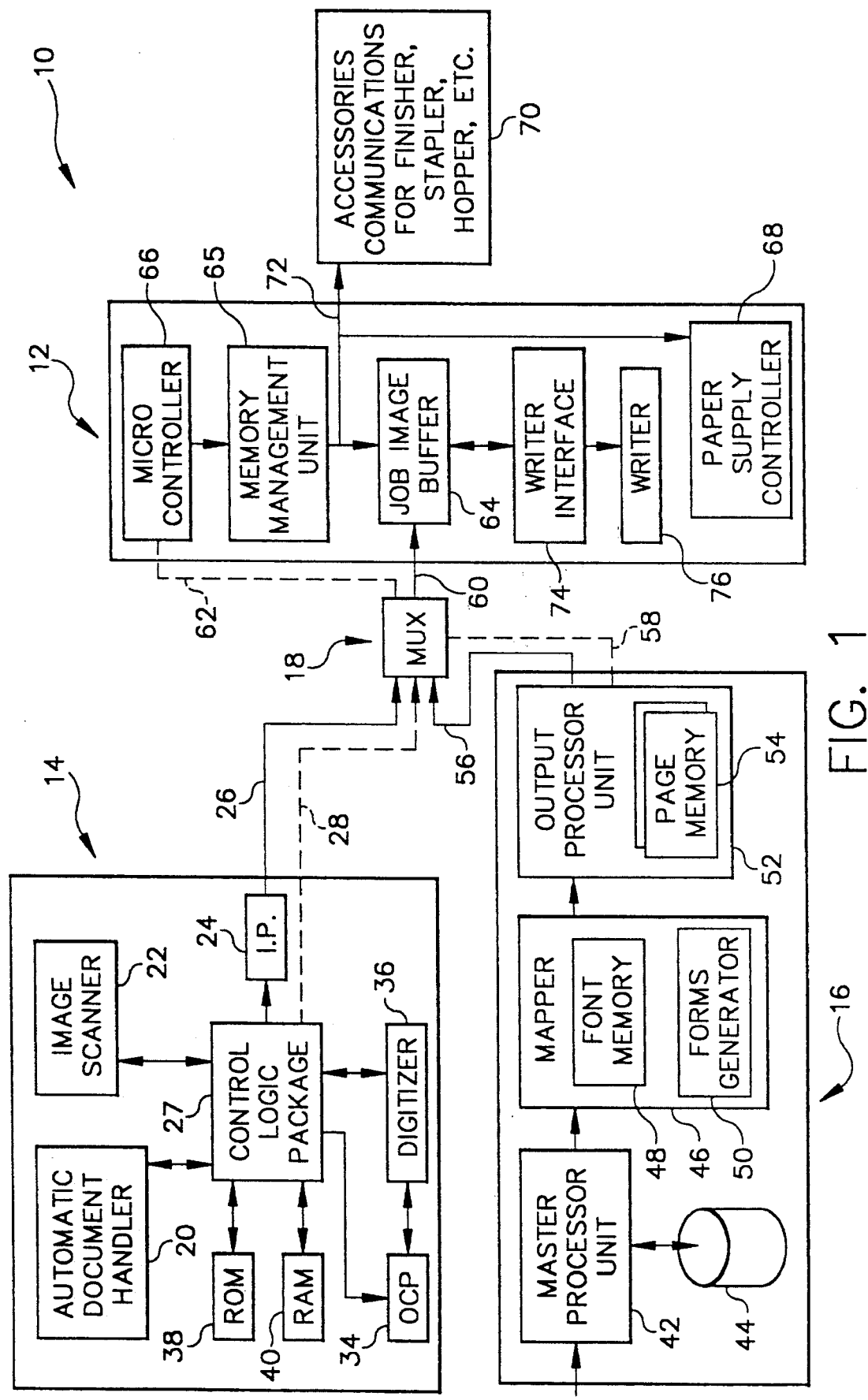
FIG. 1 is a schematic block diagram of reproduction apparatus in accordance with one embodiment of the invention.

According to FIG. 1 and with reference to U.S. Pat. No. 5,075,782, reproduction apparatus 10 includes a marking engine 12, a scanner 14 forming part of a copier portion of the reproduction apparatus, a RIP or raster image processor 16 forming part of a printer portion of the reproduction apparatus, and a multiple input controller 18 for selecting the input to the marking engine.

A document reader such as a scanner 14 is arranged for producing a series of electrical signals representative of the image content of originals. Scanner 14 consists of an automatic document handler 20 for stream feeding multiple hard copy original pages to be automatically read by an image scanner 22 such as a linear array of solid-state charge-coupled devices. The solid state device scans the original pages, converting their images to a series of electrical signals in page format for input to marking engine 12. The image data may be manipulated by image processing electronics 24. Image processing by electronics 24 may include linearity correction, unsharp masking, image editing, windowing, document recognition, magnification, accent color, color substitution, and so on. The processed image data is transmitted along an image data bus 26 to multiple input controller 18. Synchronization signals to identify separate scan lines and to provide page information and marking engine control is transmitted along a job control communications link 28.

Scanner 14 also includes a control logic package 30 having an operator control panel 34 and digitizer 36. The control logic package is an interfacing medium for the operator to input functions and to receive messages from the reproduction apparatus. Setup instructions are input to the scanner, while information for finishing and processing of jobs will be sent to marking engine 12. The logic package consists of control software, interface software, and logic hardware.

As way of example only, functions inputted by the operator at the control panel may include image editing features such as area erase (blanking and framing), image shift, book copy modes, magnification, positive-to-negative image reversal, accent (spot) color, highlighting, forms overlay, screening selected areas for breaking a continuous tone original into dots for reproduction as half-tone images, etc.

Default machine setup instructions are stored in a ROM 38. In the copier mode, an operator uses control panel 34 and digitizer 36 to input setup instruction values for storage in a RAM 40. Alternatively, setup instructions may be received via removable memory media from an off line computer, or the like. The setup instructions are used by image processing electronics 24 to modify the image data from image scanner 22, or are transmitted as control signals to marking engine 12.

Raster image processor (RIP) 16 includes a master processor unit 42 which receives high level commands and data in character code form from a main frame computer, network link, data processing work station, removable memory media, FAX, or the like. The commands are translated into machine control language by the master processing unit. A job buffer 44 stores incoming jobs and program codes for use by the master processing unit.

After interpreting a job, master processing unit 42 parcels the job to a mapper 46, which includes a font memory 48 for converting the character code data to a pixel pattern map. For color prints, the mapper separates the information into four raster patterns; one for each color available at marking engine 12. Mapper 46 may provide for character block moves, line drawing, trapezoidal fills, and windowing/clipping. It also includes a forms generator 50.

When the pixel pattern map is rasterized, mapper 46 sends page information to an output processor unit 52. The output processor unit has page memory 54, which stores image planes for transmission to marking engine 12. Preferably, them are two image plane stores so that one store can be loaded while the other is being read to the marking engine. For use in a four color printer, one might want to provide eight image plane stores so that two four-color pages can be stored.

The processed image data is transmitted along an image data bus 56 to multiple input controller 18. Synchronization signals to identify separate scan lines and to provide page information and marking engine control is transmitted along a job control communications link 58.

Alternatively, communications to the marking engine from the scanner 14 may be routed indirectly via the RIP 16 while the RIP is not idle and more directly, via the multiplexer, when the RIP is idle.

Marking engine 12 receives bit stream image data over a bus 60 and job control data over a communications link 62, both for storage in a multiple page buffer memory 64 under the control of a memory management unit 65. Memory devices may be classified as being either "totally accessible" wherein simultaneous requests for access to two different addresses can be honored, or "not totally accessible" wherein only those addresses in a particular subset can be accessed at the same time. In the embodiment of reproduction apparatus as disclosed herein, the file maintenance problem is not solvable if only one "not totally accessible" memory is used since in normal operation the scanner (or the raster image processor) and the writer will generally not be working out of the same subset. Accordingly, job image buffer should preferably consist of two or more "not totally accessible" memories or at least one "totally accessible" memory.

Control means, including a micro controller 66 is arranged to perform arithmetic and logic operations and instruction decoding as well as controlling the time allocation of peripherals (such as a paper supply controller 68 and accessories 70) through a machine control communications link 72. Several output functions may be available for receiver sheets, including selection of output trays, stapling, sorting, folding, finishing, mailbox, envelope receiver, etc.

After appropriate processing, the data is inputted to a writer interface 74 and a writer 76 for forming images on the receiver sheets.

As an example of the functions of the elements so far described, it will be assumed that an operator desires to make eight collated sets of copies of an original made up of, say, twenty pages stacked in automatic document handler 20. The operator sets control panel 34 accordingly. For purposes of this example, it will further be assumed that job image buffer 64 is fully capable of storing the information from at least the twenty original pages.

Now, control logic package 30 starts in a subroutine pre-programmed according to the switches on control panel 34 to command scanner 14 to begin operation. Automatic document handler 20 is activated to move a document into an exposure station of image scanner 22.

As the scanning progresses, data (including image information and control signals) are received by job image buffer (JIB) 64. As subsequent original documents are scanned, the processes described above are repeated until all of the original documents have been scanned and the data therefrom stored in job image buffer 64. Because job image buffer 64 is totally accessible (or there are two or more not totally accessible buffers), data can be removed from job image buffer 64 and transmitted to the writer at the same time that data is being written to the buffer.

Micro controller 65 is pre-programmed with the capacity of job image buffer 64 and with a bookkeeping function to keep track of the data loaded into the memory. Document scanning will be paused if the job image buffer is full.

One function of multiple-page image buffer 64 is to store all the pages of a particular job so that plural sets of collated pages may be produced without re-scanning the set of originals for each set produced. As such, automatic document handler 20 need not be capable of recirculating the original, but the present invention extends as well to reproduction apparatus having recirculating document handlers.

Even the best designed, operated, and maintained machine can malfunction from time to time. In reproduction apparatus, malfunctions occur, for example, due to paper jams, shortage of supplies such as image developer or receiver sheets, out of specification performance, etc. In prior art reproduction apparatus, a malfunction either in the portion of the apparatus that generates the signals representative of the image to be reproduced or in the writer portion of the apparatus has caused the shut down of the entire reproduction apparatus.

By the present invention, scanner 14 or raster image processor 16 sends image data and job processing instructions to marking engine 12, where the data and instructions are stored. Once the instructions and at least one page of image data has reached job image buffer 64, the writer begins production; reading data from buffer as needed.

Figure 2:
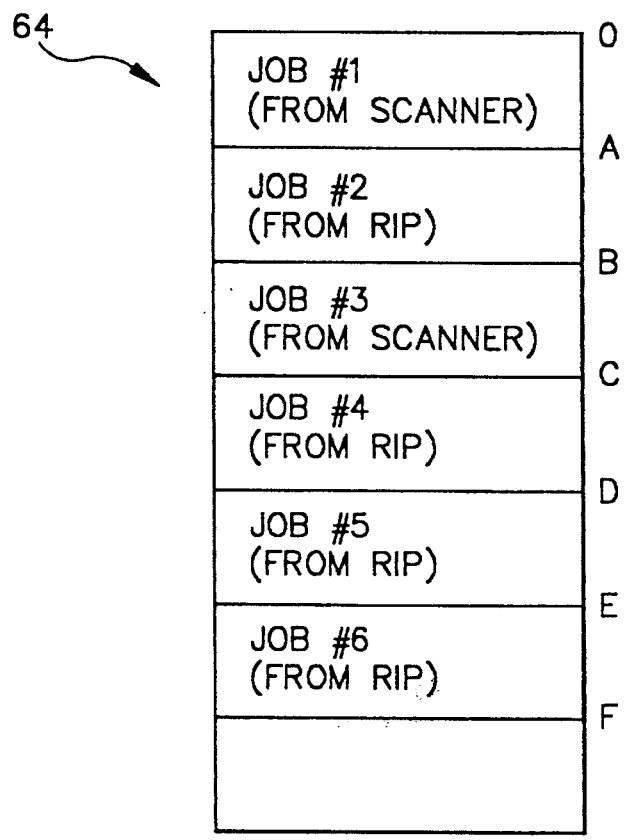
FIG. 2 is a schematic of a job queue in a job image buffer and as could occur in the apparatus of FIG. 1.

In accordance with the invention, in the event of a malfunction such as a disconnection between the marking engine and the scanner 14, the microcontroller 66 is programmed to instruct the memory management unit 65 to destroy pointers to all the jobs in the JIB 64 that are jobs which come from scanner 14 and that are in the job queue. As noted in FIG. 2 jobs incoming to the JIB are stored in first-in, first-out (FIFO) fashion. Pointers which identify begin and end addresses off each job stored in memory 64 are stored in the memory management unit along with an indication of whether the job came from scanner 14 or RIP 16. In destroying the pointers to jobs from say the scanner 14, the microcontroller 66 when requested to continue an interrupted job will review the status of the current situation and determine the following:

1. If the job interrupted is from the scanner 14 and there is a disconnection between marking engine and the scanner, the microcontroller will cause the memory management unit to find the pointers to the next job in memory. The pointers for the next job must be from the RIP since the pointers for the jobs from the scanner are erased. Thus, only jobs from the RIP will be printed.

2. If the job interrupted is from the RIP 16, and there is a disconnection between the marking engine and the scanner 14, the microcontroller will direct the memory management unit to find the pointer to the interrupted job and the address in memory of the location of the next page to be printed. Printing will be resumed from the location of the memory so that proper collated output of pages is provided to complete the printing of the job from the RIP.

When the disconnection between the scanner and marking engine occurs while a job is in progress without there being an interruption operation, the job is printed if from the RIP and remaining RIP jobs are completed since pointers to scanner jobs are erased. If the current job being printed is from the scanner and is not completed, an interrupt operation is created and production of the current job ceases. The pointers to the current job and other scanner jobs in the queue are erased and the microcontroller instructs the memory management unit to direct the JIB to provide pointers to the next job in the queue which must be a RIP job and to print the next job.

When the disconnection between the scanner and marking engine occurs while between production jobs, the pointers in memory to the scanner jobs are erased and the next production job can only be a RIP job.

When there is disconnection between one of the front end units and the marking engine, a display associated with the unit may display an informational message "Lost Communication with print engine. All jobs destroyed." The user in such a case will be satisfied that his or her job will not be seen by anyone.

This security feature is especially important on arrangements where the front end devices are relatively far from the engine (i.e., handicap ready systems or networks with users on several floors).

Figure 3:
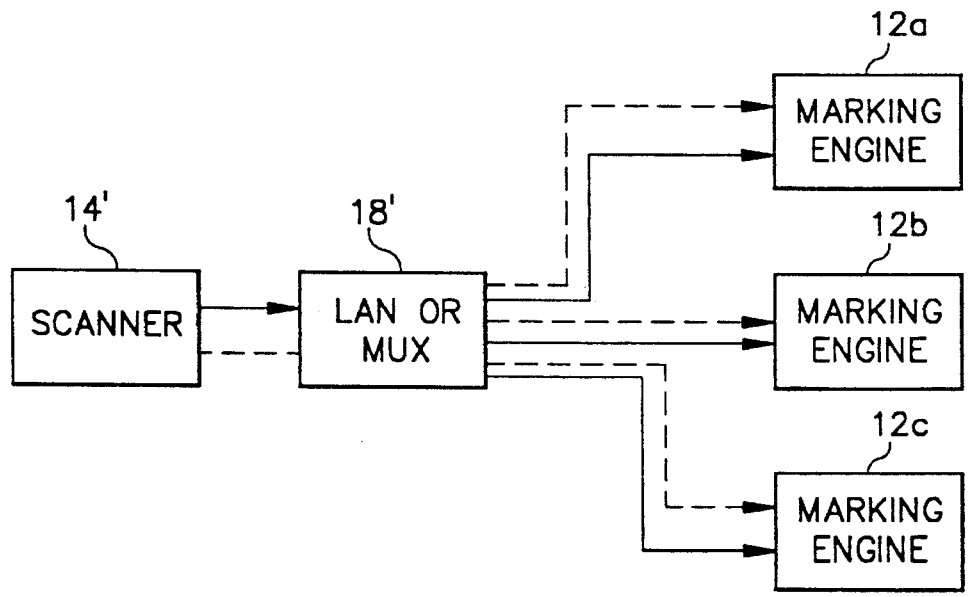
FIG. 3 is a schematic of a different embodiment of the invention featuring one front-end device that is connectable to plural output devices in accordance with the invention.

With reference to FIG. 3, a second embodiment is illustrated and assume it is in a secure environment where multiple engines 12a, 12b, 12c similar to that described above are tied to one front end device 14' (similar to that described above) in order to increase printing speed of the system as a whole. The person who is processing the job at the front end may have people with the same security clearance he or she has waiting for the job to be printed on each engine. This particular front end device may queue or input the same or different jobs to each engine via multiplexer 18' or a networking device such as LAN (local area network) or fax. The microcontroller in each marking engine is programmed so that if a break-down in communications happens between one print engine and the front end device, the job queue or job in-process in that particular marking engine will be automatically canceled and destroyed or queued for destruction.

Figure 4:
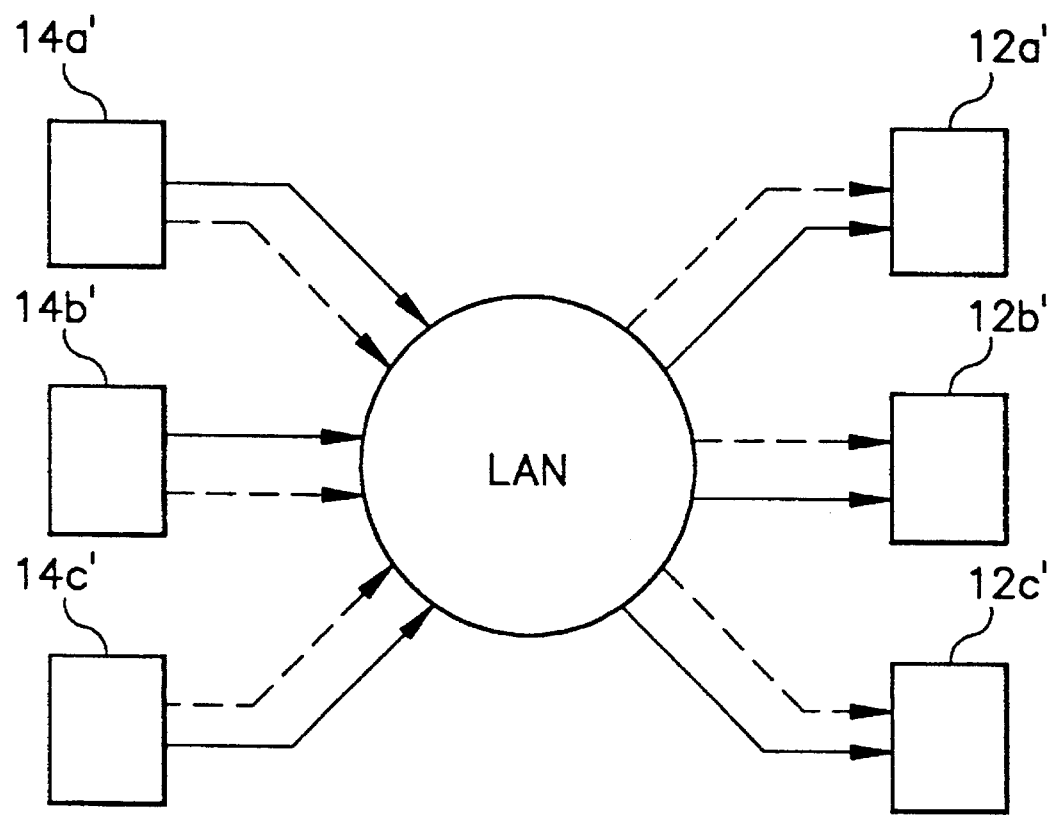
FIG. 4 is a schematic of still another embodiment of the invention wherein plural front-end devices are connectable through a network to plural output devices in accordance with the invention.

A third embodiment is illustrated in to FIG. 4 and is a generalization of the first and second cases, i.e., one or more front end devices 14a', 14b', 14c' (scanners and/or RIPs) are tied via a network such as LAN to one or more marking engines 12a', 12b', 12c' of the type referred to above.

In accordance with a program of each microcontroller in each marking engine, upon loss of connection between a front end device and any marking engine that is storing jobs from that front end device, all the jobs from that front end device are eliminated by for example removing their respective pointers as described above. Thus, each marking engine 12a', 12b', 12c' determines if it has connection with each front end device 14a', 14b', 14c' and if connection is lost with a particular front end device, the marking engine's microcontroller to which communication is lost examines its job queue to determine if jobs from that front end device are present. If they are, the pointers to such jobs are erased as described above.

In accordance with the invention, image data can be destroyed in several ways with rational behind this invention to target the destruction only to specific images, i.e., those that belong to a front end device that no longer exists in the printing network.

The image destruction can be accomplished by several means. Selective destruction may be accomplished through software, firmware of ASICS or by hardware. It may be preferred to write to those memory locations holding the image data to be erased destroying all the references to that image data. In this latter case, the image is still latent in the image memory and will be overwritten by other incoming images. The whole image buffer has to be cleaned after the engine goes to idle mode, to ensure the erasure of all images.

If a print engine has an intelligent image buffer, an extra level of security may be required in case a breakdown in communications between the image buffer subsystem and the main controller occurs. In such a case, this image buffer subsystem should destroy all images stored under the assumption that it still has power but has been removed from the marking engine to prevent image retrieval.

While the invention has been described with reference to an electrophotographic marking engine, those skilled in the art will understand that other marking engines such as ink jet, thermal, etc. may also be used.

The invention has been described in detail with particular reference to preferred embodiments thereof and illustrative examples, but it will be understood that variations and modifications can be effected within the spirit and scope of the invention.

I claim:

1. In an electronic/copier printer apparatus including scanner means for scanning original documents representing a copy production job and generating electrical signals representing said copy production job, said scanner means being a first source of image information;

printer input means for receiving electrical signals representing electronic information of a production job from a second source other than said scanner means and for processing said electronic information for input to a marking engine means;

marking engine means for printing production jobs, said marking engine means including means for communicating with said scanner means and said printer input means;

memory means, forming a part of said marking engine means, for storing electrical signals representing production jobs from said first and second sources;

and the improvement which comprises:

wherein said marking engine means includes security means, responsive to a loss of communication with one of said sources while communication remains with another of said sources for selectively destroying production jobs stored in said memory means and derived from said one of said sources to which communication is lost while selectively printing production jobs from said another of said sources to which communication remains.

2. The apparatus of claim 1 and wherein the memory means stores production jobs from said first source and from said second source in a single queue and wherein said security means destroys pointers in said queue to jobs in said memory means to prevent production of jobs stored in said memory means and derived from said one of said sources to which communication is lost while selectively retaining in said single queue pointers to production jobs from said another of said sources to which communication remains.

3. The apparatus of claim 2 and including local area networking means for coupling said marking engine means to said scanner means and said printer input means.

4. The apparatus of claim 1 and including local area networking means for coupling said marking engine means to said scanner means and said printer input means.

5. The apparatus of claim 1 and wherein said loss of communication is with said printer input means.

6. The apparatus of claim 2 and wherein said loss of communication is with said printer input means.

7. The apparatus of claim 3 and wherein said loss of communication is with said printer input means.

8. The apparatus of claim 4 and wherein said loss of communication is with said printer input means.

9. A network of plural printers and a single front end device comprising:

a front end device for generating image information to be printed;

plural marking engines, each marking engine including means for storing and then printing intonation from the front end device;

connection means coupling the front end device with the marking engines;

security means, responsive to a loss in communication between the front end device and one of the marking engines, for destroying image information stored in said one of the marking engines and derived from said front end device while enabling marking engines that remain in communication with said front end device to print image information from said front end device.

10. The network of claim 9 and wherein the connection means is a local area network.

11. A network of plural printers and plural front end devices comprising:

plural front end devices forming plural sources of image information to be printed;

plural marking engines, each marking engine including means for storing and then for printing information from any of the front end devices;

connection means coupling the front end devices with the marking engines so that the marking engines communicate with the front end devices; and security means, responsive to a loss in communication between one front end device and one marking engine, for selectively destroying image information stored in said one marking engine and derived from said one front end device and enabling said one marking engine to print image information from other front end devices to which communications are not lost with said one marking engine.

12. The network of claim 11 and wherein the connection means is a local area network.

13. The network of claim 11 and wherein in response to a loss in communication between said one front end device and said one marking engine said security means erases pointers to jobs from said one front end device that are stored in a job queue in said one marking engine.

14. The network of claim 9 and wherein said security means erases pointers in a job queue to prevent printing of image information stored in said one of the marking engines.

15. The apparatus of claim 1 and wherein the memory means stores production jobs from said first source and from said second source in a single queue and wherein said security means selectively erases jobs in said memory means to prevent production of jobs stored in said memory means and derived from said one of said sources to which communication is lost while selectively retaining in said single queue production Jobs from said another of said sources to which communication remains.

* * * * *